Patented Jan. 15, 1924.

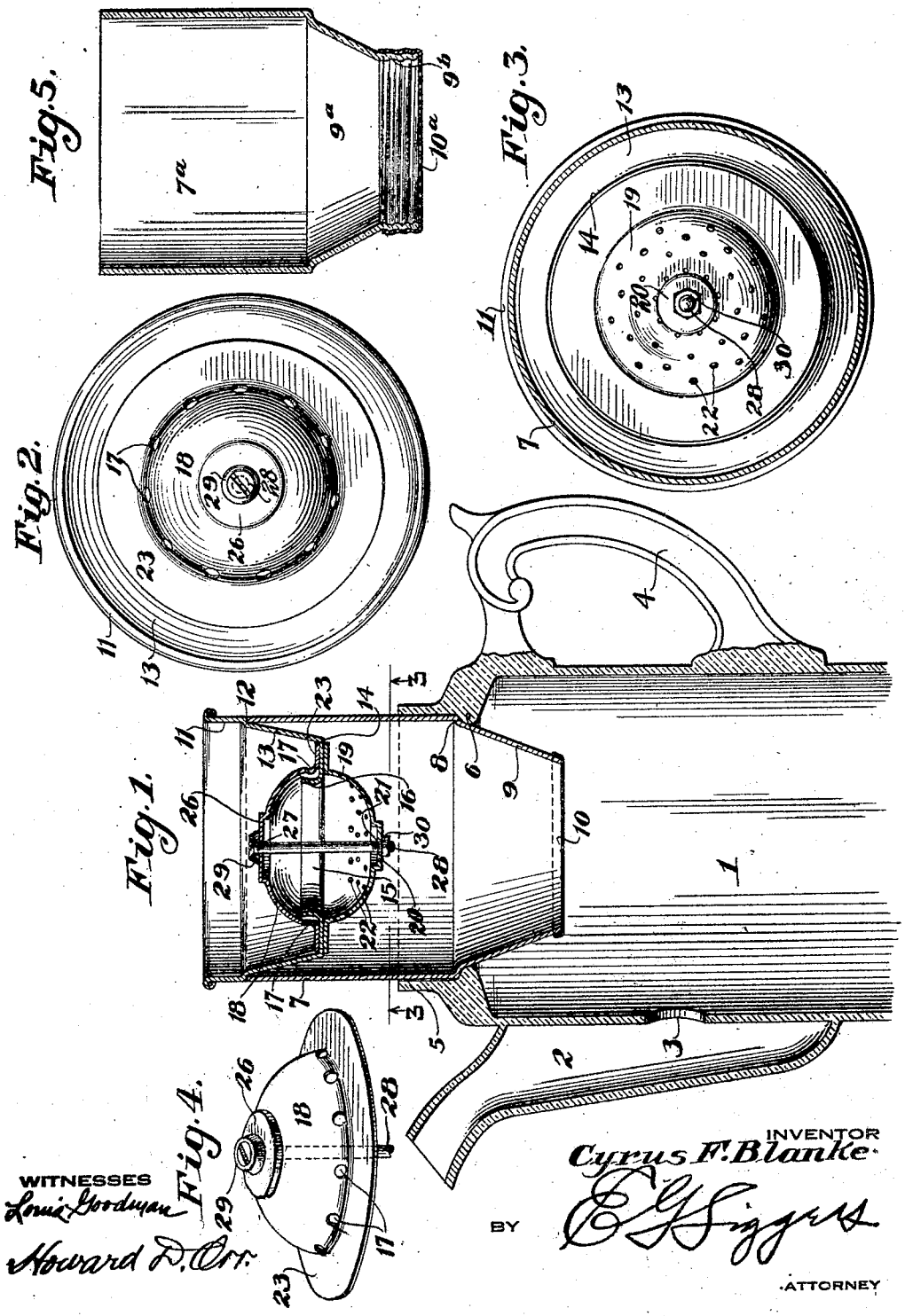

1,480,657

UNITED STATES PATENT OFFICE.

CYRUS F. BLANKE, OF ST. LOUIS, MISSOURI.

COFFEEPOT.

Application filed November 9, 1923. Serial No. 673,767.

*To all whom it may concern:*

Be it known that I, CYRUS F. BLANKE, a citizen of the United States, residing at St. Louis, in the county of St. Louis and State of Missouri, have invented new and useful Improvements in Coffeepots, of which the following is a specification.

This invention relates to coffee pots.

The object is to improve the construction of the ground coffee receptacle or container to be used in connection with the coffee pot shown in my Patent No. 943,512, or with other pots similar thereto, by the elimination of the fabric coffee bag used therein, and the substitution of a removable, metallic container for the same, which is practically indestructible.

Another object is to confine the ground coffee so as to prevent particles from entering the beverage, and at the same time permit of the thorough and complete percolation of the same by boiling water poured in at the top so that the maximum amount of flavor, strength and aroma may be obtained.

A further object is to provide a coffee receptacle fitting the top of the pot to prevent the escape of steam and aroma, the said receptacle having a tightly fitting cup-shaped cover for holding a quantity of boiling water for percolating through the ground coffee, the said cover or cup having means for permitting the water to pass very slowly through the same to be evenly distributed over the coffee, for extracting all the strength therefrom, and at the same time having means for forming a water seal to prevent escape of steam or aroma from the pot.

A final object is to provide such an attachment for coffee pots which may be readily detached, and the several parts separated for the purpose of cleansing the same.

A full and complete understanding of the invention may be obtained from a consideration of the following detailed description, taken in connection with the accompanying drawing forming a part of this specification, it being understood that while the drawing shows a practical form of the invention, the latter is not to be confined to strict conformity with the showing thereof, but may be changed or modified, so long as such changes and modifications mark no material departure from the salient features of the invention, as specifically pointed out in the appended claims.

In the drawing, in which similar reference characters designate corresponding parts throughout the several figures:—

Figure 1 is a vertical section through the upper portion of a porcelain or similar coffee pot and having the improved device applied thereto;

Figure 2 is a top plan view of the invention;

Figure 3 is a horizontal sectional view, taken on the line 3—3 of Figure 1 and looking in the direction of the arrows;

Figure 4 is a detail perspective view of the hood used in the closure or cover for effecting the water seal; and Figure 5 is a detail vertical section of a slightly modified form of ground coffee receptacle or container.

Referring to the drawing, there is shown in Figure 1, the upper portion 1 of a porcelain or similar coffee pot, the same having the usual spout 2 communicating therewith through the outlet orifice 3, and provided with an ordinary handle 4. At the top the pot is reduced and provided with an annular upstanding flange 5, having at its lower end an inwardly directed annular bead 6 to provide a shoulder for supporting the coffee receptacle in a manner to be described.

The coffee receptacle or container 7 is formed preferably of glass or some thin, non-corrosive metal such as aluminum, spun into cylindrical form, having an external diameter to snugly fit into the aforesaid annular flange 5 and to be readily removed therefrom. The cylindrical receptacle 7 is provided at its lower end with an outstanding bead or shoulder 8, which is adapted to rest upon the aforesaid annular shoulder 6 of the pot 1 to support said coffee receptacle.

Below the shoulder or bead 8, the receptacle is provided with a conical extension 9, the lower end of whose tapered walls is provided with a wire gauze screen 10, formed of fine mesh, non-corrosive wire and located well within the coffee pot when the receptacle is resting properly in the mouth of the pot, as clearly shown in Figure 1 of the drawing, the said screen being held in position at the lower end of the tapered walls in any desired manner.

The upper end of the receptacle or container 7 is adapted to be closed by a cup 11 formed of similar material, and having its upper end of substantially the same diameter and provided with a shoulder 12 to rest upon the upper end of said receptacle, the lower end of the cup being of conical form, as at 13, and provided with a bottom wall whose marginal portion 14 is horizontal and whose central portion is provided with an outlet 15, the edges of which are drawn upwardly to form a flange 16 of sufficient elevation to be higher than the upper edges of the round holes 17 in a hood 18. This results in some of the water being always confined at this point, thereby forming a water seal to prevent escape of steam and aroma.

To the bottom 14 is applied a water spreader 19 which is centrally depressed to form a depending well 20 having a central aperture 21, and the hemispherical walls of the spreader 19 are provided with a plurality of small orifices 22, as clearly shown in Figure 3 of the drawing.

Adapted to rest upon the upper surface of the annular, horizontal, marginal portion 14 of the cup 11 is the outstanding flange 23 formed around the margin of the hood 18, whose central portion is formed into an upstanding dome formation.

The dome-shaped wall of the hood 18 is provided near its base with the openings 17 in order to provide water gates or entrances, these holes being lower than the upper edge of the upturned flange 16, and the said hood is provided at the top with a central, flat portion 26 having a central aperture 27.

In order to hold the water spreader 19 and the hood 18 in their proper positions within the cup 11, a bolt 28 is employed, said bolt traversing the vertically alined apertures 21 and 27, the upper end preferably engaging a suitable washer 29 and the lower end being threaded for the reception of a nut 30 which is turned to tighten the parts.

In using the device, the cup 11 is removed from the container and the necessary amount of coffee, preferably finely ground, is placed within the container and upon the screen 10, whereupon the cup is then inserted in the container and the latter placed within the mouth of the pot. The cup 11 is then filled with boiling water drawn from some other vessel, and the latter slowly passes through the orifices 17, over the upturned flange 16 and into the spreader 19. The small openings 22 in the latter causes the water to slowly drip onto the ground coffee and to uniformly percolate the same, thus causing the strong coffee extract to drop through the screen 10 and fall into the pot 1 below. The water seal formed around the orifices 17 effectually prevent the escape of any of the strength of the aroma of the coffee, while permitting the slow inflow of the water initially placed in the cup 11, and the action of the same in passing through the ground coffee, together with the effects of the steam rising from the boiling water, as it passes through the coffee, results in the extraction of the maximum strength and aroma of the coffee.

In Figure 5, a glass receptacle or coffee container $7^a$ is shown which has the added advantage of enabling the housewife to see the condition of the ground coffee within, and the tapered or conical lower end $9^a$ thereof is extended cylindrically, as at $9^b$ and provided with threads for the reception of a threaded flange of a perforated bottom $10^a$, which acts as a support for the coffee and a strainer, as in the first-described form of the invention.

From the foregoing it will be seen that a simple, cheaply manufactured device has been provided which enables the extraction of all the strength of the coffee and the retention of its aroma, that the same will prevent any of the grounds from entering the beverage, that the device may be easily and quickly removed for filling and dismantled for thoroughly cleansing the same, and that the device eliminates the cloth dripper bag.

What is claimed is:—

1. In combination with a coffee pot, a coffee container adapted to be supported within the pot, a screen at the lower end of the container, a removable cup normally closing the upper end of the container, a perforated water spreader depending from the bottom of said cup, a dome-shaped hood arranged above the water spreader, said hood being provided with a series of perforations near its base, and means for holding the hood and the spreader to the cup.

2. In combination with a coffee pot, a coffee container adapted to be supported within the pot, a screen at the lower end of the container and adapted to support ground coffee, a removable cup normally closing the upper end of the container, said cup having its bottom provided with a central opening surrounded by an annular upturned flange, a perforated water spreader depending from the bottom of said cup, a dome-shaped hood surrounding said upturned flange in spaced relation to the same, said hood being provided with a series of perforations near its base arranged opposite said flange to permit water to pass from the cup into the hood, over the upturned flange, out through the spreader and onto the coffee upon the screen, and thence into the pot.

3. In combination with a coffee pot, a coffee container adapted to be supported within the pot, a screen at the lower end of the container adapted to support ground coffee, a removable cup normally closing the upper end of the container, said cup having an opening in the bottom surrounded by an annular upstanding flange, a perforated water spreader attached to the bottom of said cup, a dome-shaped hood mounted on the bottom of the cup and surrounding and spaced from the flange, said hood being provided with a series of perforations at its base, said perforations being below the upper edge of the flange to provide a water-sealed inlet to prevent escape of steam and aroma, and means for holding the hood and the spreader to the cup.

In testimony that I claim the foregoing as my own, I have hereto affixed my signature.

CYRUS F. BLANKE.